US006786455B1

(12) United States Patent
Bartov

(10) Patent No.: US 6,786,455 B1
(45) Date of Patent: Sep. 7, 2004

(54) METHOD FOR ENGAGING A PROBE AND DROGUE FOR AERIAL REFUELING

(76) Inventor: Asher Bartov, 603 N. Linden Dr., Beverly Hills, CA (US) 90210

( * ) Notice: Subject to any disclaimer, the term of this patent is extended or adjusted under 35 U.S.C. 154(b) by 0 days.

(21) Appl. No.: 10/236,830

(22) Filed: Sep. 5, 2002

(51) Int. Cl.⁷ .............................. B64D 37/00
(52) U.S. Cl. ................. 244/135 A
(58) Field of Search ................ 244/135 R, 135 A, 244/1 TD

(56) References Cited

U.S. PATENT DOCUMENTS

| | | | | |
|---|---|---|---|---|
| 2,663,523 A | * | 12/1953 | Leisy | 244/135 A |
| 2,879,017 A | * | 3/1959 | Smith | 244/135 A |
| 2,954,190 A | * | 9/1960 | Le Clair | 244/135 A |
| 2,960,295 A | * | 11/1960 | Schulze | 244/135 A |
| 3,008,674 A | * | 11/1961 | Abraham | 244/135 A |
| 3,285,544 A | * | 11/1966 | Chope et al. | 244/135 A |
| 6,454,212 B1 | * | 9/2002 | Bartov | 244/135 A |

* cited by examiner

*Primary Examiner*—Galen Barefoot
(74) *Attorney, Agent, or Firm*—Ira M. Siegel

(57) ABSTRACT

The invention is a method for engaging the drogue of a hose and drogue refueling system with the probe of a receiver aircraft for aerial refueling from a tanker aircraft. The tanker aircraft and receiver aircraft approximately match speed and direction, with the probe of the receiver aircraft maintained at approximately a first predetermined distance behind the tanker aircraft. The hose and drogue are extended rearward from the tanker aircraft so that the drogue is positioned at a second predetermined distance (shorter than the first predetermined distance) behind the tanker aircraft. The drogue and probe are orthogonally aligned with each other, and the hose is extended back beyond the second predetermined distance so that the drogue moves away from the tanker aircraft to and into engagement with the probe. The force of the air stream on the drogue is sufficient to provide for secure engagement of the drogue with the probe.

12 Claims, 4 Drawing Sheets

METHOD FOR ENGAGING A PROBE AND DROGUE FOR AERIAL REFUELING

BACKGROUND OF THE INVENTION

1. Field of the Invention

This invention relates to aerial refueling of a receiver aircraft having a probe for receiving fuel from a tanker aircraft having a hose and drogue system.

2. Prior Art

Aerial refueling of a receiver aircraft from a tanker aircraft has become a fairly common event. One such event was depicted in the motion picture "Air Force One." Nevertheless, aerial refueling is still a difficult and dangerous operation and is typically attempted only by military pilots in military aircraft.

Today, two types of aerial refueling systems are used by the various militaries throughout the world. One is an extendible boom system and the other is a hose and drogue system. The invention relates to the latter type system.

In a hose and drogue system, the drogue is attached to the outlet end of a hoses The inlet end of the hose is attached to a reel onto which the hose is wound. The reel is typically mounted either within the tanker aircraft's fuselage or on a refueling pod or module which is attached to the bottom of the tanker aircraft's fuselage. When the hose is deployed, the outlet end of the hose, with its attached drogue, extends behind the tanker aircraft. Depending upon the combinations of tanker and receiver aircraft and the specifications of the particular refueling system used, the total length of the hose may be 50 feet or more, and the drogue is in a preferred refueling range when it is extending about 30 feet from the reel.

When the hose and drogue are in the fully extended position (with several turns of hose still remaining on the reel), the pilot of the aircraft to be refueled maneuvers his or her aircraft into a position such that the refueling probe of the receiver aircraft enters into and engages with the drogue. The pilot continues to urge the receiver aircraft forward relative to the tanker aircraft until the drogue is in the refueling range. As the receiver aircraft is moving forward, the hose is retracted onto the reel to take up the slack in the hose. A refueling range marker is disposed on a predetermined portion of the hose. When the pilot of the receiver aircraft sees the refueling range marker reenter the tanker aircraft's fuselage or refueling pod, the receiver aircraft's pilot knows that the drogue, engaged with the receiver aircraft's probe, is in the refueling range. When the engaged drogue and probe are in the refueling range, fuel is pumped from the tanker aircraft to the receiver aircraft. After refueling is completed, the pilot of the receiver aircraft reduces its speed relative to the tanker aircraft. The hose and drogue are pulled back with the probe of the receiver aircraft, with the hose again being unwound from the reel, until the drogue and hose reach the fully extended position. At this point rotation of the reel stops, the drogue and hose cannot be pulled further back, and the receiver aircraft's refueling probe disengages from the drogue. Retraction of the hose back onto the reel then begins.

Danger arises during the initial engagement from the fact that both the tanker and receiver aircraft are not in locked relationship with each other and the hose (at least at its outlet end) and drogue, once deployed from the tanker aircraft, are not in locked relationship with either aircraft until the refueling probe makes engagement with the drogue. With each of the aircraft traveling at hundreds of miles per hour with respect to the surrounding air, there are a significant number of mis-engagements caused by excessive closing speed between the tanker and receiver aircraft. The frequency of mis-engagements increases with darkness of evening and night. Because the drogue is being, hit with considerable force and is being displaced back toward the tanker aircraft before the pilot of the receiver aircraft can reduce the speed of the receiver aircraft to match that of the tanker aircraft, a large amount of slack is formed in the hose and the hose bends into a shape resembling a sine wave.

In this condition, the hose often goes into oscillation with the result that the drogue, "whipping" about, may detach the probe from the receiver aircraft, and the drogue, either itself or with the detached probe, may hit the receiver aircraft causing loss of life and/or of the receiver aircraft.

To aid the pilots of the tanker and receiver aircraft to determine whether the drogue is in the appropriate position relative to the receiver aircraft's refueling probe for the receiver aircraft to make its run at the drogue, it has been proposed that a device including a position sensor, a receiver and/or a transmitter (hereinafter referred to as a "positer") be mounted on each of the drogue and the probe. These positers would indicate to the pilots (particularly the receiver aircraft's pilot) the positions of the drogue and probe with respect to each other. The receiver aircraft's pilot would adjust the speed and position of the receiver aircraft until confirmation is received that the drogue is directly in front of the probe and the desired distance from it. With such positers, the receiver aircraft's pilot would be receiving automated confirmation of what that pilot would ordinarily perceive visually.

In addition, it has been proposed that the drogue be fitted with jets which, in response to the relative positions of the drogue and probe, would be operated so as to maneuver the drogue up or down, left or right, or a combination of these directions, until the drogue is aligned with the probe. With such jets, the drogue could be aligned the probe even without any maneuvering of the receiver aircraft.

Both of these proposals (i.e., providing positers on the drogue and probe and fitting the drogue with jets) are intended to make alignment of the probe with the drogue quicker, easier and more reliable. They are also intended to make possible the refueling of unmanned air vehicles (commonly referred to as "UAVs"). In any event, the refueling process, once the drogue and probe are in alignment with each other, would remain the same. That is, the receiver aircraft initiates its run at the drogue by speeding up relative to the tanker aircraft, attempting to engage the drogue, and if successful, pushing it forward (i.e., toward the tanker aircraft) until the drogue is in the refueling range.

These proposals, either alone or in combination with each other, will not reduce the oscillation problem described above. So, notwithstanding these improvements, substantial danger would still exist in the course of engaging a drogue and hose for aerial refueling.

One method of minimizing the oscillation problem is to retract the hose quickly upon engagement (or contact) of the probe and drogue as described in the inventor's co-pending U.S. application Ser. No. 09/643,804, now U.S. Pat. No. 6,454,212 the contents of which are hereby incorporated herein.

Alternatively, the inventor has devised a method for substantially avoiding the oscillation problem, as described hereunder.

SUMMARY OF THE INVENTION

The invention is a new method for achieving engagement of the drogue and probe for aerial refueling. Instead of having the receiver aircraft make a run at the drogue, pursuant to the invented method the tanker aircraft and receiver aircraft approximately match speed and direction, with the probe of the receiver aircraft maintained at a first predetermined distance behind the tanker aircraft until engagement of the drogue and probe is accomplished. The hose and drogue are extended rearward from the tanker aircraft so that the drogue is positioned at a second predetermined distance behind the tanker aircraft (which second predetermined distance is shorter than the first predetermined distance), the drogue and probe are orthogonally aligned with each other, and the hose is extended back beyond the second predetermined distance so that the drogue moves rearward away from the tanker aircraft to and into engagement with the probe. The force of the air stream on the drogue is sufficient to provide for secure engagement of the drogue with the probe. Once engagement is accomplished, the hose extension is stopped.

The invention may be used with almost any hose and drogue refueling system.

DETAILED DESCRIPTION OF THE INVENTION

Figure 1:
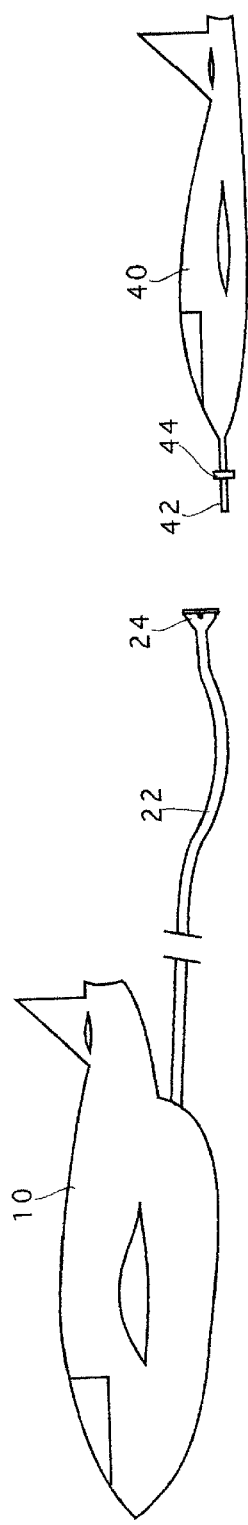
FIG. 1 is a side view of a tanker aircraft and a receiver aircraft prior to engagement of the drogue of the tanker aircraft's refueling system with the probe of the receiver aircraft.

The preferred embodiment of the invented method for engaging a drogue with a probe for aerial refueling of a receiver aircraft from a tanker aircraft is described below with the aid of the illustrations in the attached drawings which are referred to herein. The same reference numeral will be used to identify identical elements throughout the drawings.

Figure 2:
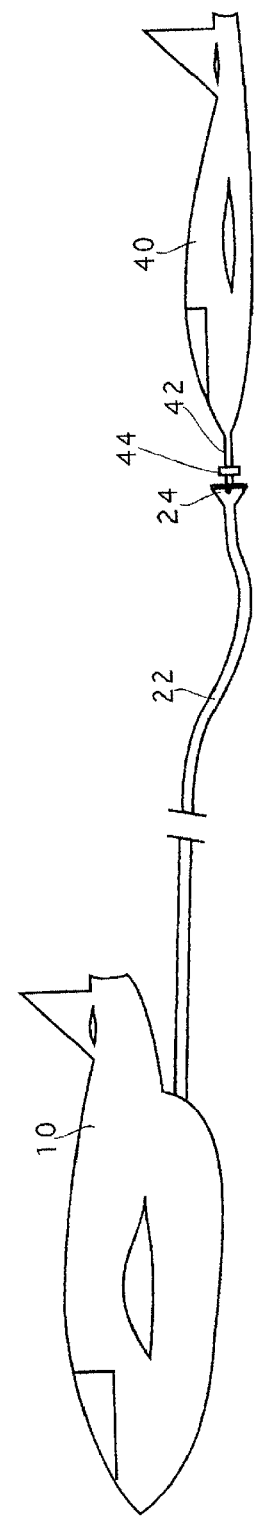
FIG. 2 is a side view of the tanker aircraft and the receiver aircraft after engagement of the drogue of the tanker aircraft's refueling system with the probe of the receiver aircraft.

In FIGS. 1 and 2 a tanker aircraft 10 and a receiver aircraft 40 are shown. Extending rearward from the tanker aircraft are refueling hose 22 and drogue 24. Positioned on the drogue is a drogue positer (which can be more clearly seen with respect to reference numeral 58 in FIGS. 3, 4 and 6.) Positioned near the forward end of the receiver aircraft's refueling probe 42 is probe positer 44.

Probe positer 44 includes a transmitter which transmits signals which can be received by drogue positer 58 and/or a receiver located on the tanker aircraft. Tanker aircraft 10 includes a means for determining the positions of the drogue and probe relative to each other.

In a preferred embodiment, drogue positer 58 includes a receiver for receiving the signal from probe positer 44 and a computer for determining, based on the signals received from the probe positer, the position of the probe relative to the drogue.

In another embodiment, drogue positer 58 includes a transmitter which transmits a signal which can be detected by a receiver on the tanker aircraft, which receiver also receives a signal transmitted from probe positer 44. A computer on the tanker aircraft then determines the positions of the probe and drogue relative to each other based on both of these signals.

In FIG. 1 the tanker and receiver aircraft are illustrated prior to the engagement of the drogue with the probe pursuant to the invention. The receiver aircraft is traveling at about the same speed and in about the same direction as the tanker aircraft, and the receiver aircraft has been positioned so that the probe is at a first predetermined distance behind the tanker aircraft. This will be referred to herein as the "ready mode." The first predetermined distance may be approximately the same as the "refueling distance" (i.e., the distance behind the tanker aircraft at which the probe is desired to be positioned during the transfer of fuel from the tanker aircraft to the receiver aircraft).

In FIG. 2 the drogue and hose are illustrated after they are engaged with each other and while the tanker and receiver aircraft are in the "hookup mode" (i.e., the drogue and probe are engaged with each other, and the speed, direction and positions of the tanker and receiver aircraft relative to each other are substantially the same as they were in the ready mode, and the transfer of fuel from the tanker aircraft to the receiver aircraft may occur). The only differences between the ready mode and the hookup mode are that the hose is further extended in the hookup mode than in the ready mode, the drogue may have been moved orthogonally and the drogue is engaged with the probe. If the first predetermined distance is different from the refueling distance, then the receiver aircraft, with the probe engaged with the drogue, would be moved, under controlled conditions, further from or closer to the tanker aircraft to arrive at the refueling distance.

That the tanker aircraft and receiver aircraft stay substantially in place relative to each other while engagement of the drogue with the probe is being accomplished is one of the benefits of the present invention. That is, the necessity of "jockeying" the receiver aircraft relative to the tanker aircraft once the tanker and receiver aircraft are within hookup range of each other and are traveling at substantially the same speed, is substantially reduced if not eliminated.

Figure 3:
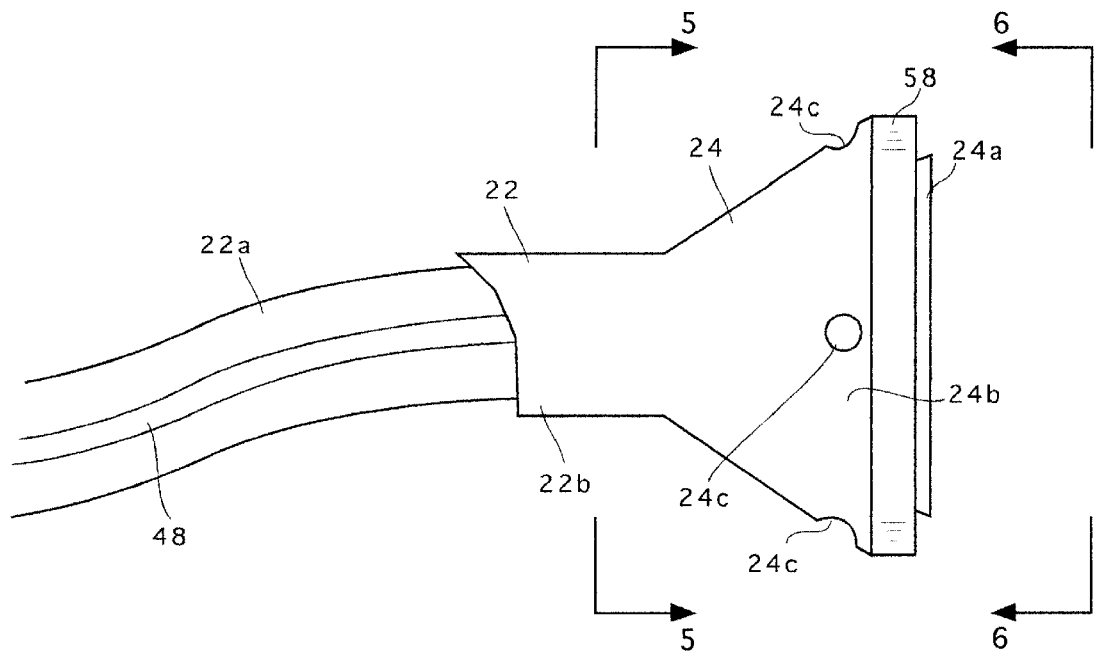
FIG. 3 is a side view of the drogue and the end of the hose to which it is attached, with a portion of its sheath cut away.
Figure 4:
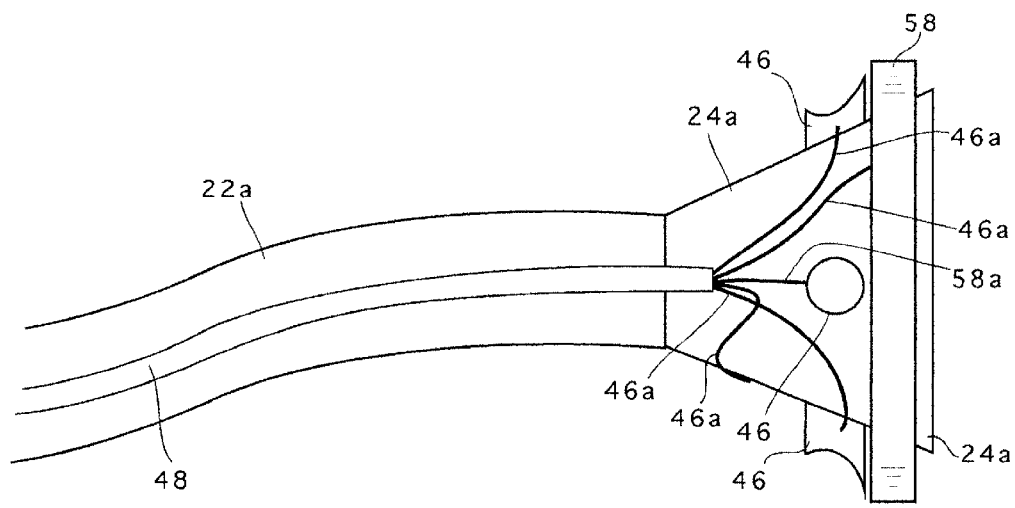
FIG. 4 is a side view of the drogue and the end of the hose to which it is attached, with its sheath removed.

FIGS. 3 and 4 are larger views of a proposed drogue 24 and the end of hose 22. Such a drogue is fitted with a drogue shifter so that the drogue may be maneuvered in any direction which is generally orthogonal to the direction in which the tanker aircraft is moving (i.e., up or down, left or right, or a combination of these directions, relative to the tanker aircraft). The drogue can be moved in a longitudinal direction (i.e., closer to or further from the tanker aircraft) by retracting or extending the hose.

As shown in FIGS. 3 and 4, hose 22 includes traditional refueling hose 22a which is covered by hose sheath 22b, and drogue 24 includes traditional drogue 24a which is covered by drogue sheath 24b. In FIG. 3 drogue 24 and the end of hose 22 are shown with a portion of hose sheath 22b cut away. In FIG. 4 drogue 24 and the end of hose 22 are shown with hose sheath 22b and drogue sheath 24b completely removed. In a preferred embodiment, the hose and drogue sheaths could be formed into a unitary whole.

Drogue 24 includes a drogue shifter including a plurality of jets 46 positioned on the outside of traditional drogue 24a.

These jets may be connected to air tubes 46a through conduit 48 to air pumps in the tanker aircraft which are selectively actuated to move the drogue in an orthogonal direction. Jets 46 are connected to drogue sheath 24b at ports 24c formed in the drogue sheath.

Drogue positer 58 is disposed around the outer perimeter of traditional drogue 24. Positer 58 may be positioned elsewhere on the drogue instead. As indicated above, in the preferred embodiment drogue positer includes a receiver for receiving the signals transmitted by the probe positer and a computer for determining the position of the probe relative to the drogue.

To the extent that the probe is orthogonally displaced from the drogue (i.e., higher or lower than, or to the left or right of, the imaginary longitudinal axis running through the drogue in a line parallel to the direction in which the tanker aircraft is traveling), the appropriate jets 46 would be actuated by a signal sent along electrically conductive cable 38a, which is also contained in conduit 48, to the air pumps in the tanker aircraft. In another embodiment, a single air pump could provide constant air pressure to all of jets 46 and drogue positer 58 could be electrically connected to actuator valves on the jets. Depending on the direction in which the drogue must be moved to be orthogonally aligned with the probe, the appropriate jets would be actuated for the appropriate amount of time.

Figure 5:
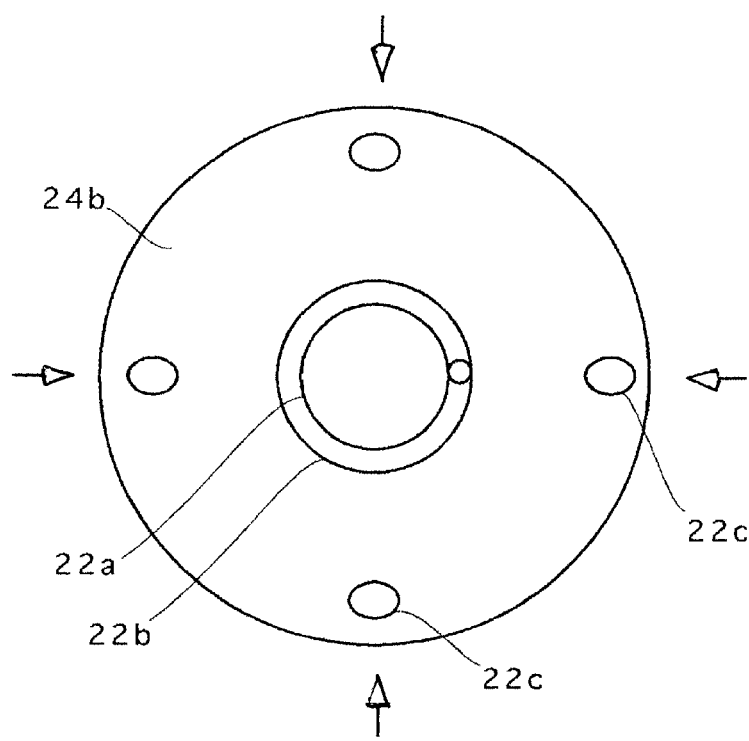
FIG. 5 is a cross-sectional view of the hose and drogue taken along line 5—5 of FIG. 3.

FIG. 5 shows drogue 24 and the end of the hose attached to it as viewed from approximately the tanker aircraft. Conduit 48 is shown, but the air tubes and cable running through it are not shown. Each hollow arrow shown adjacent to ports 24c in FIG. 5 shows the direction in which the drogue would be urged to move if the jet corresponding to that port were actuated.

Figure 6:
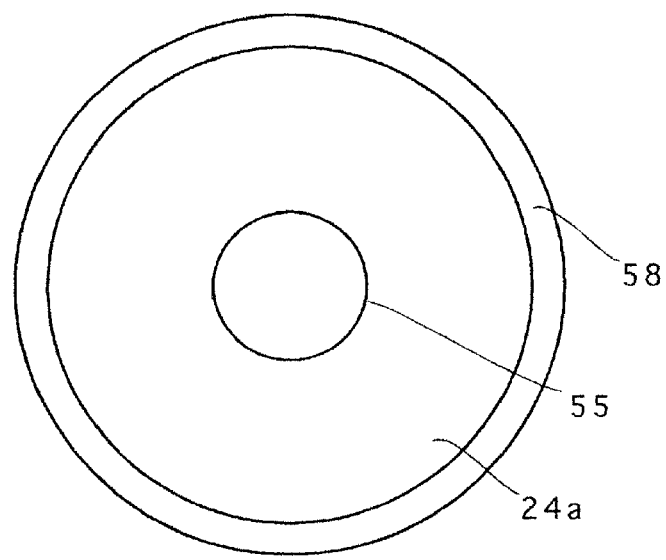
FIG. 6 is a view of the drogue taken along line 6—6 of FIG. 3.

FIG. 6 shows drogue 24 as viewed from approximately the receiver aircraft. In this view, a locking ring 59 for releasably locking the drogue to the probe can be seen.

Note that the jets described above form just one embodiment of a drogue shifter. Another embodiment of a drogue shifter would be ailerons or rudders hingedly attached to the outside surface of the drogue instead of jets. The hinges would include actuators which would adjust the angles of the ailerons in response to signals from the drogue positer 58 to maneuver the drogue into orthogonal alignment with the probe.

When the drogue and probe are in orthogonal alignment with each other (whether as a result of maneuvering of the drogue through use of the drogue shifter, maneuvering of the receiver aircraft, or both), the signal from the probe positer would be interpreted by the drogue positer to so indicate, and a signal from the drogue positer or the tanker aircraft would be transmitted to the receiver aircraft to confirm orthogonal alignment.

As discussed above in the prior art section, while the positers 44 and 58 would aid in bringing the drogue and probe into orthogonal alignment, the receiver aircraft would initiate engagement of the probe with the drogue in the traditional manner. That is, upon receiving the signal confirming orthogonal alignment, the receiver aircraft's speed would be increased and it would make its run at the drogue until the probe is brought into contact with the drogue. And, the receiver aircraft would continue to move forward relative to the tanker aircraft. As a result, the potential for introducing oscillation is not reduced.

The invention is a new method for achieving engagement of the drogue and probe for aerial refueling. Instead of having the receiver aircraft make a run at the drogue, pursuant to the invented method the tanker aircraft and receiver aircraft move into the ready mode (with the probe of the receiver aircraft positioned a first predetermined distance behind the tanker aircraft) before the drogue and probe are engaged with each other, the hose and drogue are extended rearward from the tanker aircraft so that the drogue is positioned at a second predetermined distance behind the tanker aircraft (which second predetermined distance is shorter than the first predetermined distance), the drogue and probe are orthogonally aligned with each other, and the hose is extended back beyond the first predetermined distance so that the drogue moves rearward away from the tanker aircraft to the probe. The force of the air stream on the drogue is sufficient to provide for secure engagement of the drogue with the probe. Once engagement is accomplished, the hose extension is stopped. Due to effects of inertia, there will usually be a small amount of slack in the hose before hose extension is completely stopped. If there is too much slack, the hose would then be retracted slightly. If more slack is desired, then the hose would be extended slightly. However, because (i) the hose is only being extended out to the probe of the receiver aircraft and (ii) the drogue will not be moved back and forth over a significant distance (as is done in prior art refueling methods) except under controlled conditions, the risk that the magnitude of the slack will be so large as to allow dangerous oscillation is greatly reduced.

Extension and retraction of the hose is accomplished with a hose reel system. Almost any of the types currently in use for aerial refueling would be satisfactory, and it is expected that most, if not all, hose reel'systems used in the future for aerial refueling would also be satisfactory.

Figure 7:
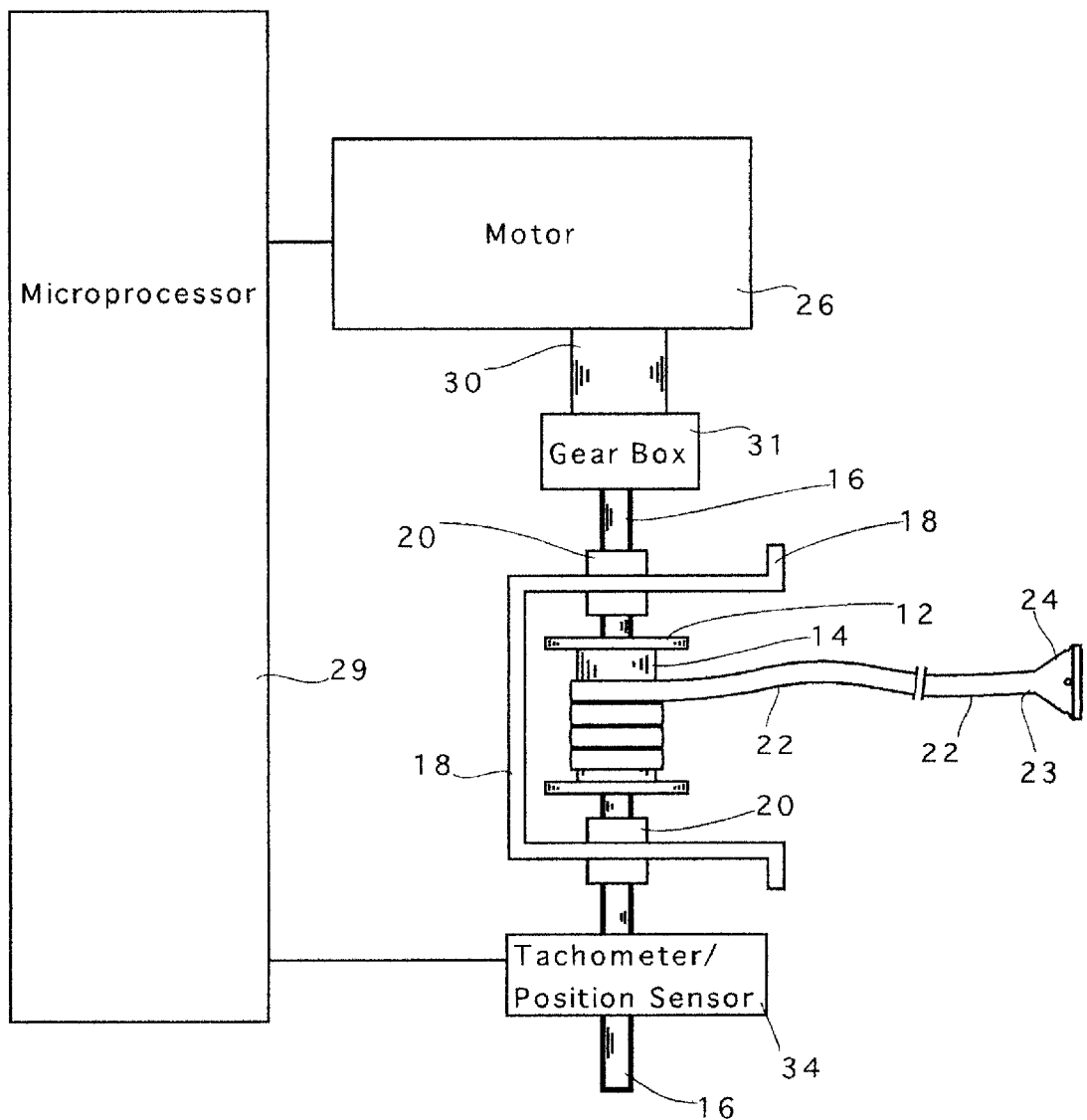
FIG. 7 is a schematic view of a hose reel system which may be used with the invention.

A preferred hose reel system is shown in FIG. 7. It includes drum 14 around which hose 22 is wound In FIG. 7, the hose is shown in a partially-deployed position, with drogue 24 attached to the free or outlet end 23 of the hose. The hose reel is mounted on reel drive shaft 16, which is mounted on housing 18 by means of bearing boxes 20. Housing 18 may be affixed to the interior of a tanker aircraft's fuselage or to a refueling pod or module which is attached to the bottom of the tanker aircraft. (In either event, the hose reel is mounted, either directly or indirectly, on the tanker aircraft's fuselage.) The inlet end of the hose is attached to the drum. Connection of (i) the conventional refueling hose (22a in FIG. 3) to the tanker aircraft's refueling supply, (ii) the air tubes (46a in FIG. 4) to air pumps, and (iii) the electric cable (58a in FIG. 4) to on board avionics, would be accomplished in any of the ways known to designers of tanker refueling configurations. The reel drive shaft is driven my motor 26. The spline shaft 30 of the motor is connected to gear box 31 which in turn is connected to an end of reel drive shaft 16.

The inventor prefers that the motor be a variable displacement hydraulic motor because such motors are highly responsive. However, other motors, including but not limited to fixed displacement hydraulic motors and dc electric motors, would work as well.

Microprocessor 29 is connected to the motor and is pre-programmed to send appropriate control signals to the motor depending upon the hose and drogue characteristics, the direction and speed of their travel relative to the reel, and other factors. Microprocessor 29 is electrically connected to the:tanker aircraft's cockpit controls so that microprocessor 29 receives flight data such as air speed data and command instructions (e.g., deploy hose and drogue, and retract hose and drogue) initiated by the tanker aircraft's pilot or by avionic equipment. The microprocessor is also in communication with the air pumps and the positers.

The hose reel system may also include a tachometer/position sensor 34, mounted on shaft 16 and electrically connected to the microprocessor, to provide data relating to the speed and direction of the hose and how far the drogue is extended from the reel.

Once engagement of the drogue and probe is accomplished, transfer of fuel from the tanker aircraft to the receiver aircraft and then disengagement of drogue from the probe may be accomplished as has been done in the prior art.

In summary, the invented method dincludes the following steps:

1. Positioning the tanker aircraft and receiver aircraft so that they are in the ready mode (i.e., the tanker and receiver aircraft are traveling at about the same speed and in about the same direction, with the probe of the receiver aircraft positioned at a first predetermined distance behind the tanker aircraft;
2. Maintaining the tanker aircraft and receiver aircraft in the ready mode (i.e., with the tanker and receiver aircraft traveling at about the same speed and in about the same direction, with the probe of the receiver aircraft maintained at approximately the first predetermined distance behind the tanker aircraft) until the drogue engages with the probe;
3. Extending the hose and drogue from the tanker aircraft into the air stream so that the drogue is positioned at a second predetermined distance behind the tanker aircraft, which second predetermined distance is shorter than the first predetermined distance;
4. Orthogonally aligning the drogue and probe with each other;
5. Extending the hose and drogue further behind the tanker aircraft until the drogue engages with the probe; and
6. Halting the hose extension.

As discussed earlier, the first predetermined distance may be approximately the same as the refueling distance.

Note that step 3 can be accomplished by maneuvering both the drogue and the receiver aircraft, or by maneuvering just the receiver aircraft (e.g., if the drogue is not outfitted with a drogue shifter).

Also note that if the drogue shifter is sufficiently responsive, orthogonal alignment may continue as the hose is being extended toward the drogue.

If the drogue shifter is sufficiently responsive, orthogonal alignment may be conducted while the drogue is extended from any position between the initial deployment position (i.e., at the distance from the tanker aircraft where the drogue first enters the air stream after the drogue and hose are deployed from the tanker aircraft) up to the first predetermined position. In this regard, the method would be described as including the following steps:

1. Positioning the tanker aircraft and receiver aircraft so that they are in the ready mode (i.e., the tanker and receiver aircraft are traveling at about the same speed and in about the same direction, with the probe of the receiver aircraft positioned at a first predetermined distance behind the tanker aircraft);
2. Maintaining the tanker aircraft and receiver aircraft in the ready mode (i.e., with the tanker and receiver aircraft traveling at about the same speed and in about the same direction, with the probe of the receiver aircraft maintained at approximately the first predetermined distance behind the tanker aircraft) until the drogue engages with the probe;
3. Deploying the hose and drogue from the tanker aircraft into the air stream;
4. Orthogonally aligning the drogue and probe with each other;
5. Extending the hose and drogue behind the tanker aircraft until the drogue engages with the probe; and
6. Halting the hose extension.

It will be understood that various changes of the details, materials, steps, arrangement of parts and uses which have been herein described and illustrated in order to explain the nature of the invention will occur to and may be made by those skilled in the art, and such changes are intended to be included within the scope of this invention.

I claim the following:

1. A method for engaging a probe of a receiver aircraft with a drogue attached to a hose connected to a tanker aircraft for aerial refueling of the receiver aircraft from the tanker aircraft, said method comprising the following steps:

(a) positioning the probe of the receiver aircraft at a first predetermined distance behind the tanker aircraft, with the tanker aircraft and receiver aircraft traveling at about the same speed and in about the same direction as each other;

(b) maintaining the probe of the receiver aircraft at approximately the first predetermined distance behind the tanker aircraft, with the tanker aircraft and receiver aircraft traveling at about the same speed and in about the same direction as each other until the drogue engages with the probe;

(c) deploying the hose and drogue from the tanker aircraft;

(d) orthogonally aligning the drogue and the probe with each other; and (e) extending the hose and drogue further behind the tanker aircraft until the drogue engages with the probe.

2. The method of claim 1, including the following additional step:

(f) after said drogue engages with said probe, halting the hose extension.

3. The method of claim 1, wherein transfer of fuel from the tanker aircraft to the receiver aircraft is desired to occur with said probe of said receiver aircraft being at a refueling distance behind said tanker aircraft, and wherein said first predetermined distance is approximately equal to said refueling distance.

4. The method of claim 1, wherein said hose is attached to a hose reel system mounted on said tanker aircraft.

5. The method of claim 1, wherein said hose reel system includes a reel driven by a variable displacement hydraulic motor.

6. The method of claim 1, wherein in step (d) a drogue shifter is used to maneuver said drogue into orthogonal alignment with said probe.

7. A method for engaging a probe of a receiver aircraft with a drogue attached to a hose connected to a tanker aircraft for aerial refueling of the receiver aircraft from the tanker aircraft, said method comprising the following steps:

(a) positioning the probe of the receiver aircraft at a first predetermined distance behind the tanker aircraft, with the tanker aircraft and receiver aircraft traveling at about the same speed and in about the same direction as each other;

(b) maintaining the probe of the receiver aircraft at approximately the first predetermined distance behind the tanker aircraft, with the tanker aircraft and receiver aircraft traveling at about the same speed and in about the same direction as each other until the drogue engages with the probe;

(c) positioning the drogue a second predetermined distance behind the tanker aircraft, which second predetermined distance is shorter than the first predetermined distance;

(d) orthogonally aligning the drogue and the probe, with each other; and (e) extending the hose and drogue further behind the tanker aircraft until the drogue engages with the probe.

8. The method of claim 7, including the following additional step:

(f) after said drogue engages with said probe, halting the hose extension.

9. The method of claim 7, wherein transfer of fuel from the tanker aircraft to the receiver aircraft is desired to occur with said probe of said receiver aircraft being at a refueling distance behind said tanker aircraft, and wherein said first predetermined distance is approximately equal to said refueling distance.

10. The method of claim 7, wherein said hose is attached to a hose reel system mounted on said tanker aircraft.

11. The method of claim 7, wherein said hose reel system includes a reel driven by a variable displacement hydraulic motor.

12. The method of claim 1, wherein in step (7) a drogue shifter is used to maneuver said drogue into orthogonal alignment with said probe.

* * * * *